United States Patent
Zafar et al.

(10) Patent No.: US 7,245,261 B2
(45) Date of Patent: Jul. 17, 2007

(54) SATELLITE DIVERSITY ANTENNA SYSTEM

(75) Inventors: Imtiaz Zafar, Sterling Heights, MI (US); Jerral A. Long, Kokomo, IN (US); Joseph R. Dockemeyer, Jr., Kokomo, IN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/179,866

(22) Filed: Jul. 12, 2005

(65) Prior Publication Data

US 2007/0013593 A1  Jan. 18, 2007

(51) Int. Cl.
*H01Q 1/32* (2006.01)

(52) U.S. Cl. ............... 343/713; 343/700 MS; 343/846

(58) Field of Classification Search ......... 343/700 MS, 343/853, 850, 713, 895, 846, 848
See application file for complete search history.

(56) References Cited

U.S. PATENT DOCUMENTS

| | | | |
|---|---|---|---|
| 5,905,467 A | 5/1999 | Narayanaswamy et al. | |
| 6,448,930 B1 | 9/2002 | Judd | |
| 2004/0017316 A1* | 1/2004 | Tanaka et al. | 343/700 MS |
| 2004/0032373 A1 | 2/2004 | Petros et al. | |
| 2004/0155821 A1* | 8/2004 | Ohara et al. | 343/700 MS |
| 2005/0093743 A1 | 5/2005 | Park et al. | |
| 2006/0071867 A1 | 4/2006 | Quagliaro | |
| 2006/0109178 A1* | 5/2006 | Takeuchi et al. | 343/700 MS |

OTHER PUBLICATIONS

EP Search Report dated Aug. 22, 2006.

* cited by examiner

*Primary Examiner*—Hoanganh Le
(74) *Attorney, Agent, or Firm*—Jimmy L. Funke

(57) ABSTRACT

A satellite antenna module is disclosed. The satellite antenna module includes at least one antenna element disposed on a ground plane. The ground plane is capacitivly coupled to a vehicle surface. The ground plane is disposed over the vehicle surface at an elevation angle that achieves a higher gain of the at least one antenna element.

25 Claims, 4 Drawing Sheets

SATELLITE DIVERSITY ANTENNA SYSTEM

FIELD

The invention relates to a satellite antenna system. More particularly, the invention relates to a satellite diversity antenna system.

BACKGROUND

Automotive vehicles are becoming commonly equipped with antennas that receive and process signals other than traditional AM/FM signals, such as, for example, satellite signals. In particular, antennas relating to satellite digital audio radio services (SDARS), which is broadcast on the 2320-2345 MHz frequency band, is becoming widely available in vehicles as an originally-installed component by an original equipment manufacturer (OEM), or, alternatively, as an after-market component that is installed after the vehicle has been manufactured by the OEM. SDARS offer a digital radio service covering a large geographic area, such as North America. Satellite-based digital audio radio services generally employ either geo-stationary orbit satellites or highly elliptical orbit satellites that receive up-linked programming, which, in turn, is re-broadcast directly to digital radios in vehicles on the ground that subscribe to the service.

SDARS antennas, such as, for example, patch antennas, presently track two satellites at a time. Thus, the location of the SDARS patch antennas on a vehicle is critical for obtaining proper reception. As a result, SDARS patch antennas may be mounted on the vehicle exterior, usually on the roof. Some SDARS antennas have been located at locations other than the vehicle roof in a "hidden antenna" application; however, reception performance of the antenna may be compromised if the antenna is moved away from the roof. To achieve higher gains for improving the antenna performance, antennas have been positioned at different locations on the vehicle with the output of each antenna summed in a phase array summation implementation. Another methodology to improve antenna performance includes two or more antennas positioned at different locations on a vehicle in a switched diversity application where signal reception is switched amongst antenna elements if the receiving antenna element loses the signal.

Although adequate for most situations, the phase array summation implementation introduces design and installation complexities. Even further, the switched diversity implementation does not achieve a higher gain of the received satellite signal. A need therefore exists for an improved antenna system that provides reception of SDARS signals while achieving higher gains and maintaining vehicle aesthetics.

BRIEF DESCRIPTION OF THE DRAWINGS

The inventors have recognized the above-described and other problems associated with an antenna system that receives satellite signals. The present invention will now be described, by way of example, with reference to the accompanying drawings, in which.

DETAILED DESCRIPTION

Figure 1A:
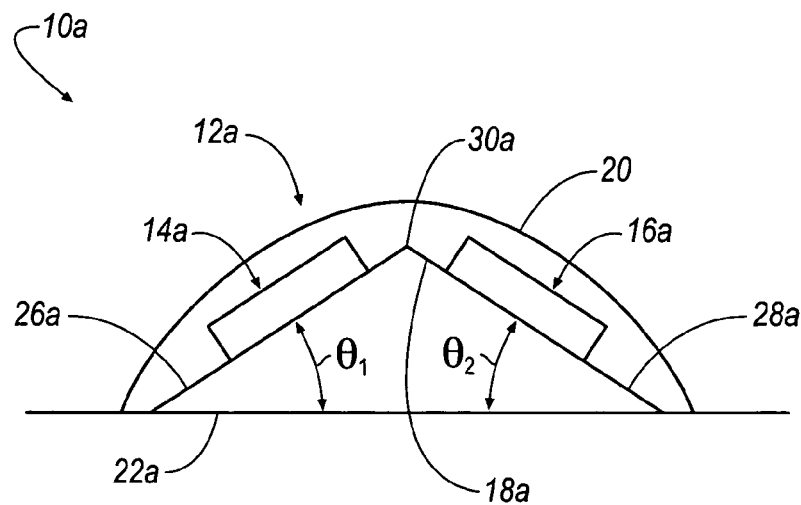
FIG. 1A is a sectional view of an antenna system according to an embodiment.
Figure 1B:
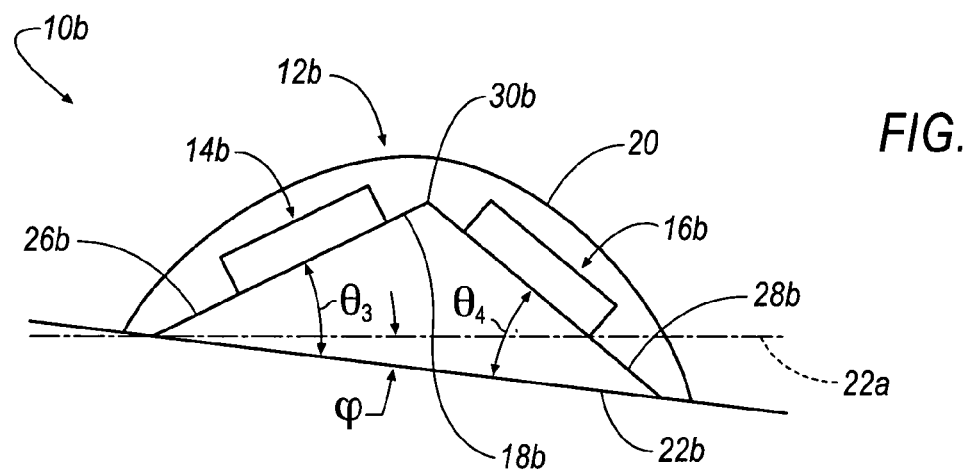
FIG. 1B is a sectional view of an antenna system according to an embodiment.
Figure 1C:
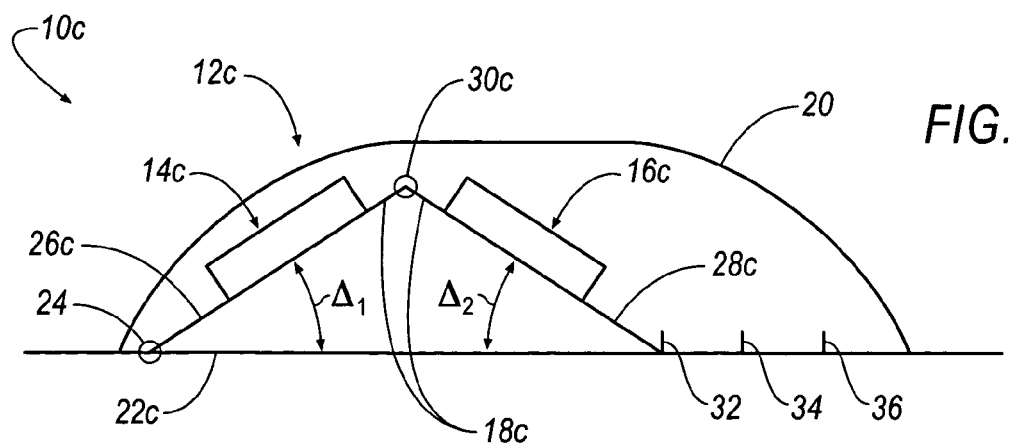
FIG. 1C is a sectional view of an antenna system according to an embodiment.

The above-described disadvantages are overcome and a number of advantages are realized by an inventive antenna system, which is shown generally at $10a$-$10c$ in FIGS. 1A-1C, respectively. As illustrated, each antenna system $10a$-$10c$ comprises an antenna module, which is shown generally at $12a$-$12c$, that includes a first patch antenna $14a$-$14c$, a second patch antenna $16a$-$16c$, a ground plane $18a$-$18c$, and a protective radome $20$. The antenna modules $12a$-$12c$ are placed over an outer surface of a vehicle, such as, for example, a vehicle roof $22a$-$22c$, which may comprise metal.

Each first patch antenna $14a$-$14c$ and second patch antenna $16a$-$16c$ are generally well-known structures including an antenna element $11a$, $11b$ (FIGS. 2A-2C) that may receive satellite and terrestrial signals, a low noise amplifier $13a$, $13b$ (FIGS. 2A-2C), and a printed circuit board (not shown) including associated electronics (not shown) that processes the received satellite signals. The frequency of the satellite signals may range, for example, between approximately 2320-2345 MHz (i.e. the SDARS frequency range).

The ground plane $18a$-$18c$ may comprise a sheet of conductive, lightweight metal that includes at least two surfaces $26a$-$26c$, $28a$-$28c$ that are bent, pressed, or otherwise shaped to include a peak $30a$-$30c$, which may be shaped to include a corner as illustrated, or, alternatively, a rounded peak. As illustrated, the first patch antenna $14a$-$14c$ is placed over the first side $26a$-$26c$ and the second patch antenna $16a$-$16c$ is placed over the second side $28a$-$28c$. If desired, the ground plane $18a$, $18b$ may alternatively include a solid piece of lightweight metal rather than a sheet; however, a solid ground plane $18a$-$18c$ may undesirably increase the cost of the part due to the extra material while also increasing the weight of the antenna system $10a$-$10c$. If the ground plane $18a$, $18b$ is solid, the ground plane $18a$, $18b$ would include a third side adjacent the vehicle roof $22a$-$22c$.

If the vehicle roof $22a$-$22c$ is metallic, the ground plane $18a$-$18c$ is capacitively coupled to the vehicle roof $22a$-$22c$. As illustrated, the generally triangular, ramp-shape of the ground plane $18a$-$18c$ is selectively shaped or otherwise formed to include any desirable pair of elevation angles with respect to the vehicle roof, which is shown generally at $\theta_1$ and $\theta_2$ (FIG. 1A), $\theta_3$ and $\theta_4$ (FIG. 1B), and $\Delta_1$ and $\Delta_2$ (FIG. 1C). The elevation angles $\theta_1$-$\theta_4$, $\Delta_1$, $\Delta_2$ may range, for example, approximately between $5°$-$60°$. The elevation angle range could be optimized for low or high elevation angles for a particular market within or outside of the elevation range. In an application-specific example, the design of some antennas used in Canada may have low elevation angles, and therefore, the antennas may have to be tuned to a narrow beamwidth.

Preferably, to maintain antenna performance, each ground plane $18a$-$18c$ is shaped or otherwise formed to include equivalent pairs of elevation angles $\theta_1$ and $\theta_2$, $\theta_3$ and $\theta_4$, $\Delta_1$ and $\Delta_2$, thereby forming the ground plane $18a$-$18c$ into an isosceles triangle. However, it will be appreciated that the elevation angles $\theta_1$ and $\theta_2$, $\theta_3$ and $\theta_4$, $\Delta_1$ and $\Delta_2$, for each respective ground plane 18a-18c may be shaped to include non-similar angles such that the triangular shape of each ground plane 18a-18c is a non-isosceles triangle.

The elevation angles $\theta_1$ and $\theta_2$, $\theta_3$ and $\theta_4$, shown in FIGS. 1A and 1B, respectively, are fixed with respect to the vehicle roof 22a, 22b. As shown in FIG. 1A, the vehicle roof 22a is substantially flat with respect to the ground that the vehicle travels on. As shown in FIG. 1B, the vehicle roof 22b includes a contour with respect to the ground that the vehicle travels on, and, as a result, the elevation angles, $\theta_3$ and $\theta_4$, of the patch antennas 14b, 16,b with respect to sky are effected by a pitch angle, $\phi$. The pitch angle, $\phi$, may alternatively result from the title angle of a roof-rack or sunroof that may carry the antenna module 12b. Accordingly, in comparison to a substantially flat vehicle roof 22a with respect to ground, the pitch angle, $\phi$, related to the second antenna module 12b effectively decreases the elevation angle, $\theta_3$, with respect to sky to ($\theta_3-\phi$) while the elevation angle, $\theta_4$, with respect to sky is increased to ($\theta_4+\phi$); however, if desired, the elevation angles, $\theta_3$ and $\theta_4$, may be shaped as described above with angles that forms a non-isosceles triangle such that when the pitch angle, $\phi$, is considered, the patch antennas 14b, 16b may be elevated with respect to sky at the same angles.

Referring to FIG. 1C, another embodiment shows an adjustable ground plane 18c. The adjustable ground plane 18c includes a first hinge point 24 proximate the vehicle roof 22c and a second hinge point substantially located at the peak 30c. As illustrated, the second side 28c rests against a retainer or tab 32 proximate the vehicle roof 22c. To adjust the elevation angles $\Delta_1$ and $\Delta_2$, the second side 28c may be adjusted to rest against a second tab 34, 36 proximate the vehicle roof 22c. Accordingly, the elevation angles $\Delta_1$ and $\Delta_2$ are not fixed (as compared to the elevation angles $\theta_1$ and $\theta_2$, $\theta_3$ and $\theta_4$, shown in FIGS. 1A and 1B), but rather, may be adjusted in the field of operation of the vehicle if the elevation angles $\Delta_1$, $\Delta_2$ are not optimized to a maximum gain for the received satellite signal.

In design, the elevation angles, $\theta_1$-$\theta_4$, are optimized to achieve a desirable gain value for any desirable satellite elevation (i.e. a low or high latitude location). If an adjustable ground plane 18c is provided, a skilled technician may adjust the ground plane 18c, or, alternatively, instructions may be provided in a user-manual so that the user may adjust the ground plane 18c. Regardless of the fixed or adjustable nature of the ground plane 18a-18c, the desirable gain value for a vehicle receiving satellite signals that is located, for example, in Boca Raton, Fla., is substantially different from a gain value for a vehicle receiving satellite signals in geographically different location, such as, for example, in Bangor, Me. Accordingly, the antenna modules 12a-12c may be designed to include any desirable fixed or adjustable elevation angles to meet any satellite service provider specification or optimal service performance in the field.

Each patch antenna 14a-14c, 16a-16c is also tuned to a narrow beamwidth instead of an omni-directional pattern. The average and minimum gain values increase by more than 2.0 dB over an omni-directional pattern placed at a conventionally-inclined patch antenna elevation angles of zero degrees. Beside the pitch angle, $\phi$, of the roof 22b, the elevation angle, $\theta_1$ and $\theta_2$, $\theta_3$ and $\theta_4$, $\Delta_1$ and $\Delta_2$, of each patch antenna 14a-14c, 16a-16c may be varied as described above in view of the effects of cross-coupling from one patch antenna element to another. The patch antenna orientation (i.e., the antenna elements+ground) within each module 12a-12c may vary from 0° to 360°. Even further, separation of each patch antenna element 14a-14c, 16a-16c may range from ½ to 1/16 wavelength in order to minimize the effects of cross coupling/loading from each other.

Figure 2A:
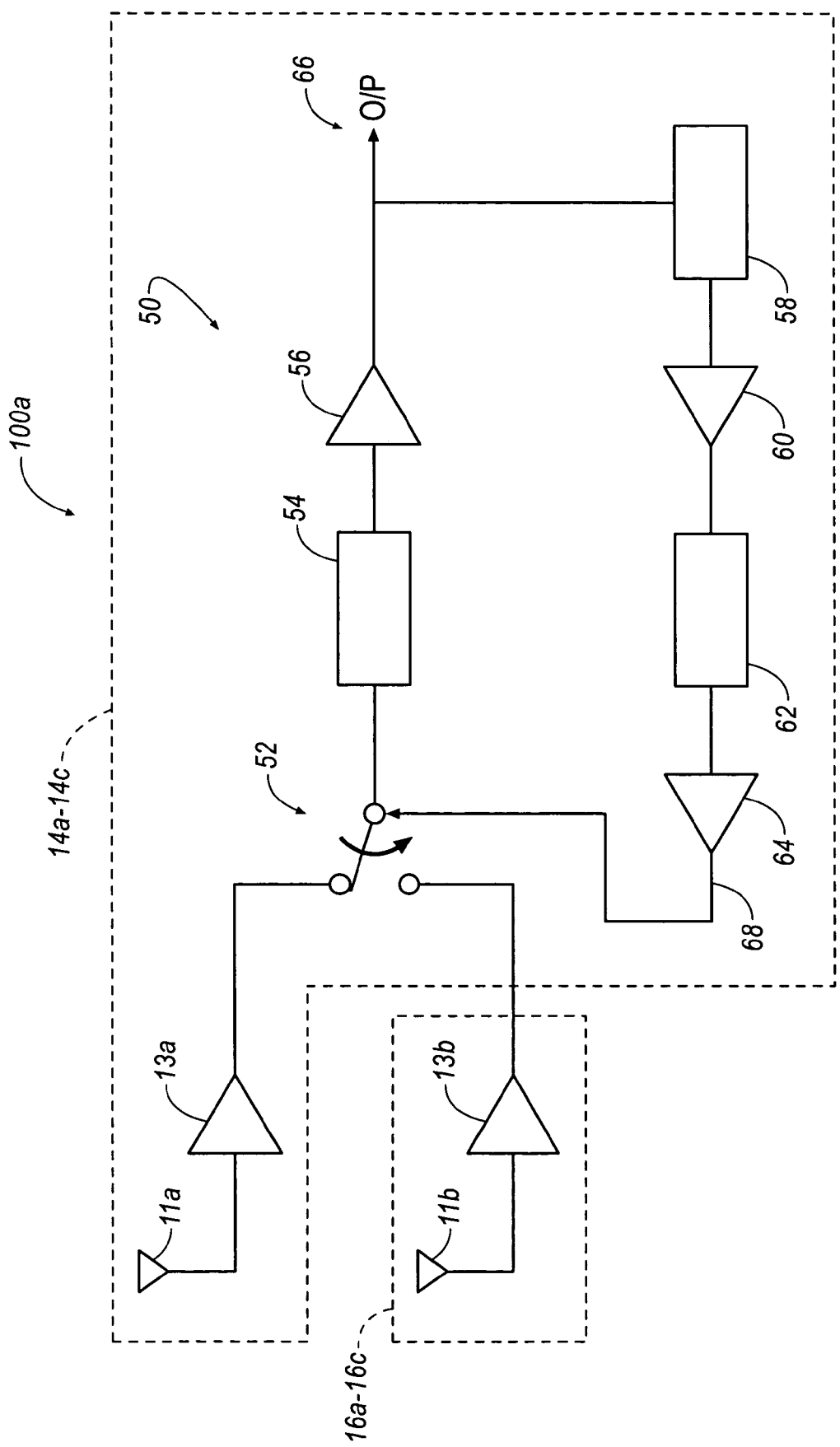
FIG. 2A is a block diagram illustrating the electronics for operating a diversity antenna system of FIGS. 1A-1C according to an embodiment.
Figure 2B:
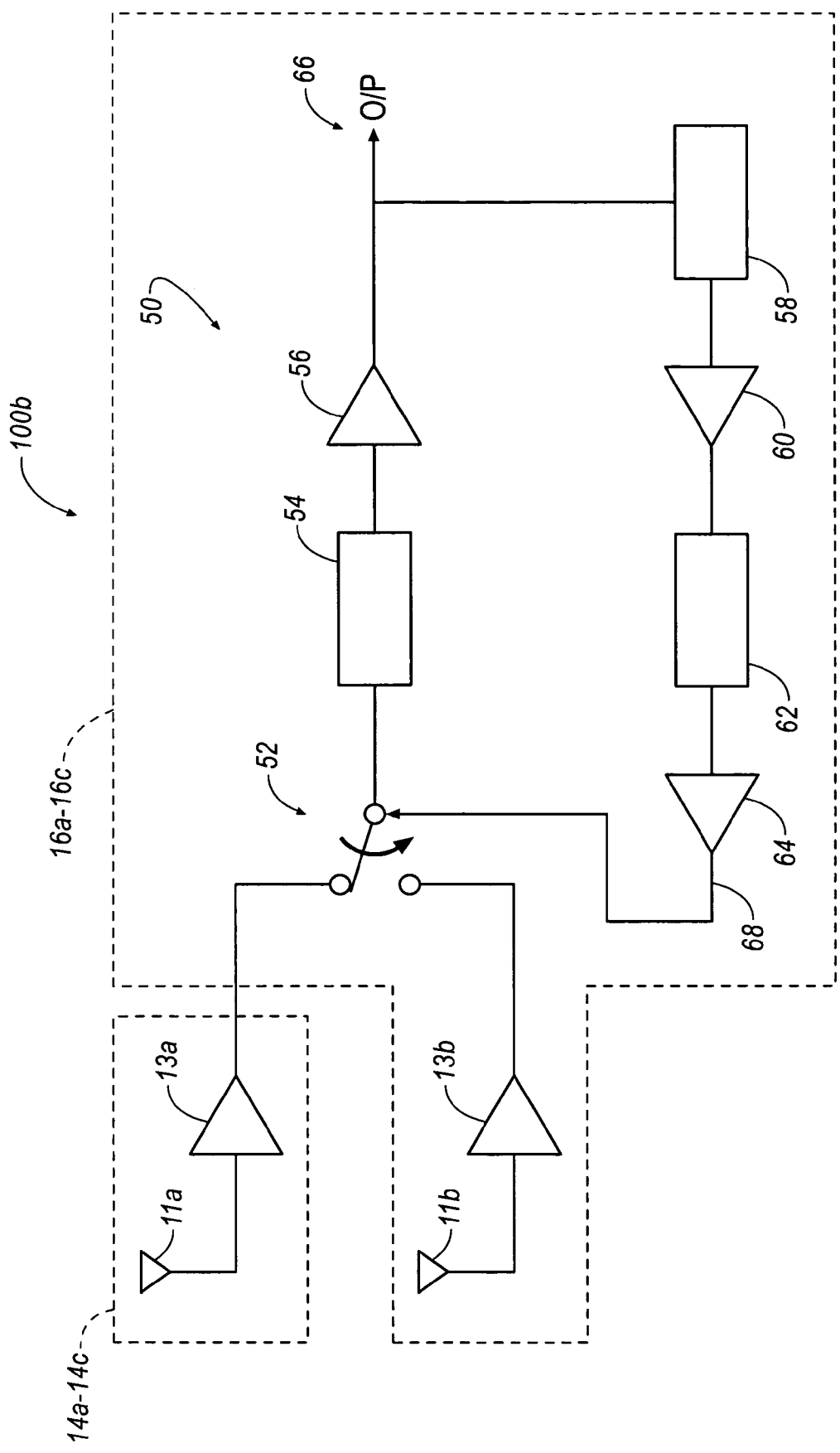
FIG. 2B is a block diagram illustrating the electronics for operating a diversity antenna system of FIGS. 1A-1C according to an embodiment.
Figure 2C:
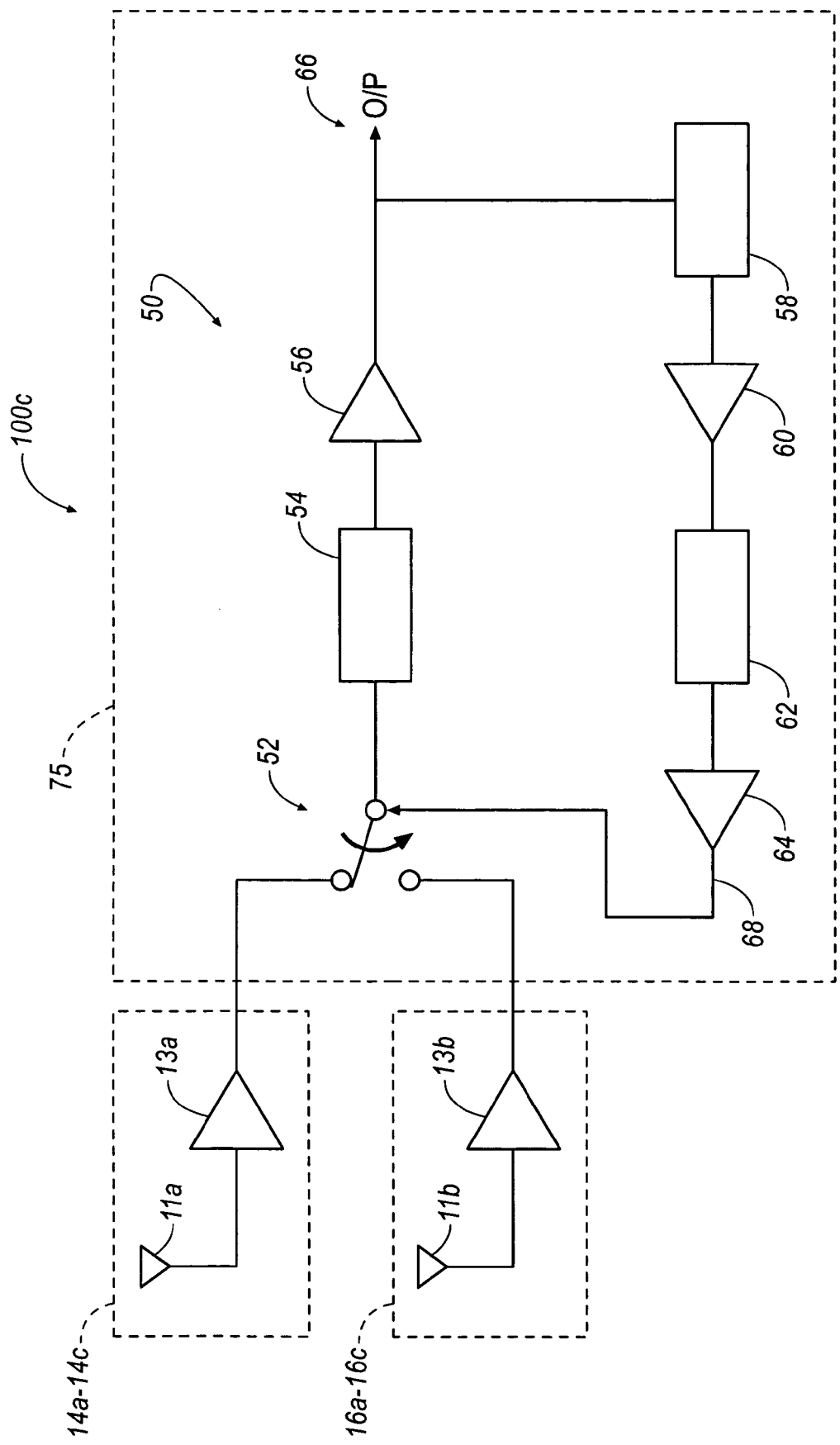
FIG. 2C is a block diagram illustrating the electronics for operating a diversity antenna system of FIGS. 1A-1C according to an embodiment.

Referring to FIGS. 2A-2C, each patch antennas 14a-14c, 16a-16c may include well-known diversity electronics 50 on the circuit board of the patch antenna 14a-14c (FIG. 2A) or patch antenna 16a-16c (FIG. 2B). Alternatively, the patch antennas 14a-14c, 16a-16c may be connected by two cables to a receiver 75 including the diversity electronics 50 (FIG. 2C). As shown in FIGS. 2A and 2B, if the diversity electronics 50 is incorporated within one of the patch antenna elements 14a-14c or 16a-16c, a cable may extend from one patch antenna element to another for connection at a pin diode switch element 52. The output of the patch antenna including the diversity electronics is then output at reference numeral 66.

As is known in the art, a diversity application includes one or more antennas elements to improve antenna performance. If a first antenna in a diversity application loses reception of an expected signal, the diversity application will poll the other antenna(s) in the application for expected signal reception so that the diversity system will switch to a different antenna that is receiving the expected signal while the reception of the expected signal by the first antenna is temporarily unavailable. The well-known diversity switching circuitry 50 includes the pin diode switch 52, a filter 54, a low noise amplifier (LNA) 56, a buffer 58, an amplifier 60, a rectifier 62, and a comparator 64. The LNA 56 and buffer 58 share an output node to a radio-frequency cable 66 and the output of the comparator is fed-back to the pin diode switch 52, which is shown generally at 68.

The antenna systems 10a-10c described above essentially utilizes two independent patch antennas 14a-14c, 16a-16c that are elevated to any desirable fixed or adjustable elevation angle, $\theta_1$ and $\theta_2$, $\theta_3$ and $\theta_4$, $\Delta_1$ and $\Delta_2$, in a single antenna module 12a-12c. Additionally, one of the patch antennas 14a-14c, 16a-16c may include the diversity switching electronics 50 to further reduce wiring and other design complexities.

The antenna systems 10a-10c described above may receive satellite audio signals; however, it will be appreciated that the antenna systems 10a-10c may receive other satellite signals, such as, for example, satellite video signals. In order to integrate satellite video capability, the use of special hierarchal modulation techniques of the signal may be implemented to receive the satellite video signals. In addition to the functional features described above, the antenna systems 10a-10c maintain a visually pleasing roof-mount "hidden antenna" design where the antenna elements and electronics are concealed under the protective radome 20. Even further, it will be appreciated that the antenna systems 10a-10c are not limited to patch antennas 14a-14c, 16a-16c. Any desirable antenna element that receives terrestrial and satellite signals may be used in the antenna systems 10a-10c, including, for example, helix or monopole antennas.

While the invention has been specifically described in connection with certain specific embodiments thereof, it is to be understood that this is by way of illustration and not of limitation, and the scope of the appended claims should be construed as broadly as the prior art will permit.

What is claimed is:
1. A satellite antenna module comprising:
   at least one antenna element disposed on a ground plane, wherein the ground plane is capacitively coupled to a vehicle surface, wherein the ground plane is disposed over the vehicle surface at an elevation angle that achieves a higher gain of the at least one antenna element;

wherein the ground plane includes at least a first side and a second side that are joined at a peak.

2. The satellite antenna module according to claim 1, wherein the ground plane includes a sheet of conductive, lightweight metal.

3. The satellite antenna module according to claim 1, wherein the elevation angle ranges between approximately between 5°-60°.

4. The satellite antenna module according to claim 1, wherein the at least one antenna element includes integrated diversity electronics.

5. The satellite antenna module according to claim 1, wherein the at least one antenna element receives satellite signals between a frequency range of approximately 2320-2345 MHz.

6. The satellite antenna module according to claim 1, wherein the at least one antenna element is a patch antenna, helix antenna, or a monopole antenna that receives terrestrial and satellite signals.

7. A satellite antenna module comprising:
at least one patch antenna element disposed on a ground plane, wherein the ground plane is capacitively coupled to a vehicle surface, wherein the ground plane is disposed over the vehicle surface at an adjustable elevation angle that achieves a higher gain of the at least one patch antenna element
wherein the ground plane includes at least a first side and a second side that are joined at a hinged peak, wherein at least one patch antenna element is disposed on one of the first or second side, wherein a hinge point is located at an end of one of the first or second side proximate the vehicle surface to permit the ground plane to be reconfigured to change the adjustable elevation angle.

8. The satellite antenna module according to claim 7, wherein the ground plane includes a sheet of conductive, lightweight metal.

9. The satellite antenna module according to claim 7, wherein the elevation angle ranges between approximately between 5°-60°.

10. The satellite antenna module according to claim 7, wherein the at least one patch antenna element includes integrated diversity electronics.

11. The satellite antenna module according to claim 7, wherein the at least one patch antenna element receives satellite signals between a frequency range of approximately 2320-2345 MHz.

12. A satellite antenna module comprising:
a ground plane including a first side and a second side that are joined at a peak, wherein a first patch antenna element is disposed on the first side and a second patch antenna element is disposed on the second side; and
a vehicle surface that supports and is capacitively coupled to the ground plane, wherein the first side and second side are positioned at an elevation angle relative the vehicle surface to achieve a higher gain of the first and second patch antenna elements.

13. The satellite antenna module according to claim 12, wherein the ground plane includes a sheet of conductive, lightweight metal.

14. The satellite antenna module according to claim 12, wherein the elevation angle ranges between approximately between 5°-60°.

15. The satellite antenna module according to claim 12, wherein one of the first or second patch antenna element includes integrated diversity electronics, wherein the first and second patch antenna elements are connected by a single cable to operate in a diversity antenna configuration.

16. The satellite antenna module according to claim 12, wherein the first and second patch antennas receive satellite signals between a frequency range of approximately 2320-2345 MHz.

17. A satellite antenna module comprising:
a ground plane including a first side and a second side that are joined at a peak, wherein a first patch antenna element is disposed on the first side and a second patch antenna element is disposed on the second side, wherein one of the first or second patch antenna element includes integrated diversity electronics, wherein the first and second patch antenna elements are connected by a single cable to operate in a diversity antenna configuration; and
a vehicle surface that supports and is capacitively coupled to the ground plane, wherein the first side and second side are positioned at an elevation angle relative the vehicle surface to achieve a higher gain of the first and second patch antenna elements.

18. The satellite antenna module according to claim 16, wherein the ground plane includes a sheet of conductive, lightweight metal.

19. The satellite antenna module according to claim 17, wherein the elevation angle ranges between approximately between 5°-60°.

20. The satellite antenna module according to claim 17, wherein the first and second patch antennas receive satellite signals between a frequency range of approximately 2320-2345 MHz.

21. An antenna system comprising:
two or more patch antenna elements disposed respectively on two or more ground planes, wherein the two or more ground planes are capacitively coupled to a vehicle surface, wherein the two or more ground planes are disposed over the vehicle surface at an elevation angle that achieves a higher gain of the two or more patch antenna elements, wherein the two or more patch antenna elements operate in a diversity antenna configuration
wherein the ground planes are joined at a hinged peak, wherein a hinge point is located proximate the vehicle surface to permit the ground planes to be reconfigured to change the adjustable elevation angle.

22. The antenna system according to claim 21, wherein the two or more ground planes include a sheet of conductive, lightweight metal.

23. The antenna system according to claim 21, wherein the elevation angle ranges between approximately between 5°-60°.

24. The antenna system according to claim 21, wherein at least one of the two or more patch antenna elements include integrated diversity electronics.

25. The antenna system according to claim 21, wherein the two or more patch antenna elements receive satellite signals between a frequency range of approximately 2320-2345 MHz.

* * * * *